(No Model.)

N. CLARK.
BARBED FENCE WIRE.

No. 260,844. Patented July 11, 1882.

Witnesses:
Allen Webster
Geo. O. Kingsbury

Inventor:
Norman Clark
By Andrew J. Upham
Atty

UNITED STATES PATENT OFFICE.

NORMAN CLARK, OF STERLING, ILLINOIS, ASSIGNOR OF ONE-HALF TO ISADORE A. UPHAM, OF SPRINGFIELD, MASSACHUSETTS.

BARBED FENCE-WIRE.

SPECIFICATION forming part of Letters Patent No. 260,844, dated July 11, 1882.

Application filed January 5, 1882. (No model.)

*To all whom it may concern:*

Be it known that I, NORMAN CLARK, of Sterling, in the county of Whiteside and State of Illinois, have invented certain new and useful Improvements in Barbed Fence-Wire, of which the following is a specification.

My invention consists in the combination of three or more main wires (being neither twisted nor braided with each other) with barbed pieces wrapped around one or more of the main wires, and having one or more of the main wires woven against the barbed pieces, in the manner as herein set forth.

Figure 1:
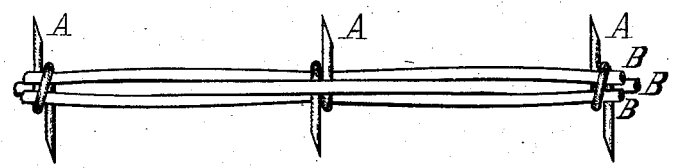
Figure 2:
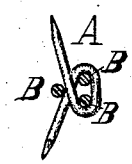
Figure 3:
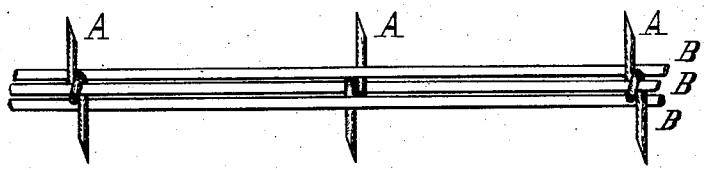
Figure 4:
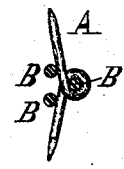

In the accompanying drawings, in which similar letters of reference indicate like parts, Figure 1 is a side view of a section of my barbed fence-wire, showing the appearance of the barb on each side. Fig. 2 shows a cross-section of the fencing material, the strands being in section. Figs. 3 and 4 show a modification of my invention.

The object of this invention is to provide a fencing material having suitable barbs arranged at proper intervals along its length in such manner that lateral movement is prevented, and so constructed that, without being twisted or braided, a strong, simple, cheap, lasting, and elastic fencing material is produced.

The best method of manufacturing this fencing material I deem to be that illustrated in Figs. 1 and 2 of the drawings—i. e., to wrap the barbed piece A around two outer wires and weave the central wire between the outer wires and against the barbed pieces A, the projecting ends of each alternate one of which project in opposite directions, in the manner shown, thus forming a notch within which the central wire will securely rest. A similar result is, however, attained if it be manufactured in the manner illustrated in Figs. 3 and 4, in which the barbed pieces are wrapped around the central wire and the outer wires rest within the notch formed by the projecting ends.

It will be seen that I form an open fencing-strand in which there are but few, if any, places for moisture to remain and cause corrosion, and that a given length may be made with less material than if the main wires were twisted or braided.

If a galvanized wire be used in the manufacture of a fencing material in which the main wires are twisted or braided, the galvanizing is liable to become cracked, while in my method of construction the main wires are not subjected in the manufacture to any sharp bending that will injure either the galvanizing or the fiber; and if the main wires contract in cold weather, the pieces A will, under strain, spring sufficiently to allow the main wires to lie in more nearly straight lines, thus compensating for contraction and preventing breakage, while the slack occasioned by expansion in warm weather will be taken up by the reaction. An elastic fencing-strand is thus produced. It will also be seen that the weaving of the main strands against the pieces A in the manner shown will prevent lateral movement of the barbed pieces.

I am well aware that a fencing material has been heretofore made in which the main wires are twisted or braided together and the barbed piece twisted or interwoven therein, and that a fencing material having two wires alternately approaching and separating and having a barbed piece wrapped around them at the points where they come together, have been heretofore made. The objections to the first have been hereinbefore stated, and the second is objectionable in that all expansion and contraction must be compensated for by the main wires, while with mine the barbed pieces assist.

Having thus described my invention, what I claim as new, and desire to secure by Letters Patent, is—

1. A fencing-strand consisting of three or more main wires (neither braided nor twisted with each other) having barbs A wrapped around one or more of said wires, and having the remaining wire or wires woven against said barbs, substantially as set forth.

2. A fencing-strand having three or more main wires (neither braided nor twisted with each other) and barbed pieces A wrapped around one or more of the main wires and projecting to form an angle, as shown, the ends of each alternate one of which pieces project in opposite directions, and having one or more main wires woven to bear within the angle, substantially as shown.

In witness whereof I hereunto set my hand, in the presence of two witnesses, this 30th day of December, A. D. 1881.

NORMAN CLARK.

Witnesses:
 GEO. B. BEARDSLEY,
 J. W. NELSON.